United States Patent
Zhao et al.

(10) Patent No.: US 12,494,815 B2
(45) Date of Patent: Dec. 9, 2025

(54) SIGNAL TRANSCEIVING DEVICE, SIGNAL AMPLIFICATION DEVICE, AND OPERATION METHOD OF COMMUNICATION SYSTEM

(71) Applicant: ZTE CORPORATION, Guangdong (CN)

(72) Inventors: Lu Zhao, Guangdong (CN); Yang Guo, Guangdong (CN); Bo He, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 336 days.

(21) Appl. No.: 18/034,639

(22) PCT Filed: Nov. 1, 2021

(86) PCT No.: PCT/CN2021/127871
§ 371 (c)(1),
(2) Date: Apr. 28, 2023

(87) PCT Pub. No.: WO2022/095817
PCT Pub. Date: May 12, 2022

(65) Prior Publication Data
US 2023/0396284 A1 Dec. 7, 2023

(30) Foreign Application Priority Data
Nov. 4, 2020 (CN) .......................... 202011215744.7

(51) Int. Cl.
*H04B 1/40* (2015.01)
*H03F 3/24* (2006.01)

(52) U.S. Cl.
CPC ............... *H04B 1/40* (2013.01); *H03F 3/245* (2013.01); *H03F 2200/294* (2013.01); *H03F 2200/451* (2013.01)

(58) Field of Classification Search
CPC ... H04B 1/40; H04B 1/44; H04B 1/48; H04B 1/50; H03F 3/245; H03F 2200/294; H03F 2200/451
See application file for complete search history.

(56) References Cited

U.S. PATENT DOCUMENTS

| | | | | |
|---|---|---|---|---|
| 2005/0250541 A1* | 11/2005 | Bird | ....................... | H04B 17/18 455/561 |
| 2011/0026442 A1* | 2/2011 | Yoon | ....................... | H04B 17/20 370/278 |

(Continued)

FOREIGN PATENT DOCUMENTS

| | | |
|---|---|---|
| CN | 101018086 A | 8/2007 |
| CN | 101414844 A | 4/2009 |

(Continued)

OTHER PUBLICATIONS

WIPO, International Search Report issued on Jan. 5, 2022.
(Continued)

*Primary Examiner* — Lester G Kincaid
(74) *Attorney, Agent, or Firm* — Li & Cai Intellectual Property (USA) Office

(57) ABSTRACT

Disclosed is a signal transceiving device, including: a radio frequency signal transceiving unit, a signal transmission-reception control unit, and a first control signal unit. The radio frequency signal transceiving unit is configured to generate a first radio frequency signal according to a baseband signal and send the first radio frequency signal. The signal transmission-reception control unit is configured to generate a first control instruction and control the radio frequency signal transceiving unit to send the first radio frequency signal. The first control signal unit is configured to convert the first control instruction into a first transmission signal, send the first transmission signal, receive a second transmission signal, convert the second transmission (Continued)

signal into a second control instruction, and send the second control instruction to the signal transmission-reception control unit.

14 Claims, 3 Drawing Sheets

(56) References Cited

U.S. PATENT DOCUMENTS

2012/0147978 A1* 6/2012 Sychaleun ............... H04L 5/06
 375/257
2015/0358070 A1 12/2015 Ohm

FOREIGN PATENT DOCUMENTS

| | | |
|---|---|---|
| CN | 201742570 U | 2/2011 |
| CN | 107819483 A | 3/2018 |
| CN | 113572493 A | 10/2021 |
| JP | 2004194351 A | 7/2004 |
| WO | WO 2020118585 A1 | 6/2020 |

OTHER PUBLICATIONS

European Patent Office, the extended European Search Report dated Sep. 30, 2024, for corresponding EP application No. 21888514.3.

* cited by examiner

SIGNAL TRANSCEIVING DEVICE, SIGNAL AMPLIFICATION DEVICE, AND OPERATION METHOD OF COMMUNICATION SYSTEM

CROSS-REFERENCE TO RELATED APPLICATION

The present disclosure is a National Phase Application filed under 35 U.S.C. 371 as a national stage of PCT/CN2021/127871, filed on Nov. 1, 2021, an application claiming the priority to Chinese Patent Application No. 202011215744.7 filed with the CNIPA on Nov. 4, 2020, the entire contents of which are incorporated herein by reference.

TECHNICAL FIELD

The present disclosure relates to the technical field of communications.

BACKGROUND

With the development of communication technology, requirements of communication devices (such as a signal transceiving device) on high power and small volume become higher and higher.

SUMMARY

Embodiments of the present disclosure provide a signal transceiving device, a signal amplification device, and an operation method of a communication system.

In the first aspect, the present disclosure discloses a signal transceiving device, including: a radio frequency signal transceiving unit, a signal transmission-reception control unit, and a first control signal unit.

The radio frequency signal transceiving unit is connected between a baseband interface and at least one radio frequency interface, and is configured to generate a first radio frequency signal according to a baseband signal from the baseband interface, send the first radio frequency signal to the at least one radio frequency interface, and receive a second radio frequency signal from the at least one radio frequency interface; and the at least one radio frequency interface is configured to be connected to a radio frequency interface of a signal amplification device through a cable.

The signal transmission-reception control unit is connected to the radio frequency signal transceiving unit, and is configured to generate a first control instruction, control the radio frequency signal transceiving unit to send the first radio frequency signal to the at least one radio frequency interface according to the first control instruction, receive a second control instruction, and control the radio frequency signal transceiving unit to receive the second radio frequency signal from the at least one radio frequency interface according to the second control instruction.

The first control signal unit is connected between the signal transmission-reception control unit and a transmission interface of the signal transceiving device, and is configured to convert the first control instruction generated by the signal transmission-reception control unit into a first transmission signal, send the first transmission signal to the transmission interface of the signal transceiving device, receive a second transmission signal from the transmission interface of the signal transceiving device, convert the second transmission signal into the second control instruction, and send the second control instruction to the signal transmission-reception control unit; and the transmission interface of the signal transceiving device is configured to be connected to a transmission interface of the signal amplification device through a cable.

According to an embodiment of the present disclosure, the signal transmission-reception control unit generating the first control instruction includes: determining first time when controlling the radio frequency signal transceiving unit to send the first radio frequency signal to the at least one radio frequency interface, and generating the first control instruction according to a first time difference between the first time and a basic pulse.

According to an embodiment of the present disclosure, the first control signal unit converting the first control instruction generated by the signal transmission-reception control unit into the first transmission signal and sending the first transmission signal to the transmission interface of the signal transceiving device includes: determining a first applied voltage value according to the first control instruction generated by the signal transmission-reception control unit; and applying a first direct current bias voltage with the first applied voltage value to a cable connected to the transmission interface of the signal transceiving device, so as to send the first direct current bias voltage to the transmission interface of the signal transceiving device as the first transmission signal.

According to an embodiment of the present disclosure, the first control signal unit converting the first control instruction generated by the signal transmission-reception control unit into the first transmission signal and sending the first transmission signal to the transmission interface of the signal transceiving device includes: converting the first control instruction generated by the signal transmission-reception control unit into the first transmission signal, and sending the first transmission signal by the first control signal unit to the transmission interface of the signal transceiving device at least a predetermined transmission delay ahead of the signal transmission-reception control unit controlling the radio frequency signal transceiving unit to send the first radio frequency signal according to the first control instruction.

According to an embodiment of the present disclosure, the at least one radio frequency interface and the transmission interface of the signal transceiving device are an integral structure.

According to an embodiment of the present disclosure, the at least one radio frequency interface includes a first radio frequency interface and a second radio frequency interface, the radio frequency signal transceiving unit is configured to send the first radio frequency signal to the first radio frequency interface and receive the second radio frequency signal from the second radio frequency interface.

In the second aspect, the present disclosure discloses a signal amplification device, including: a power amplifier, a low noise amplifier, a signal amplification control unit, and a second control signal unit.

The power amplifier is connected between an antenna and a radio frequency interface of the signal amplification device, and is configured to receive a first radio frequency signal from the radio frequency interface of the signal amplification device, amplify the first radio frequency signal, and then send the amplified first radio frequency signal to the antenna, and the radio frequency interface of the signal amplification device is configured to be connected to a radio frequency interface of a signal transceiving device through a cable.

The low noise amplifier is connected between the antenna and a radio frequency interface of the signal amplification device, and is configured to receive a second radio frequency signal from the antenna, amplify the second radio frequency signal, and then send the amplified second radio frequency signal to the radio frequency interface of the signal amplification device.

The signal amplification control unit is connected to the power amplifier and the low noise amplifier, and is configured to receive a first control instruction and control the power amplifier to receive the first radio frequency signal from the radio frequency interface of the signal amplification device according to the first control instruction, or generate a second control instruction and control the low noise amplifier to send the second radio frequency signal to the radio frequency interface of the signal amplification device according to the second control instruction.

The second control signal unit is connected between the signal amplification control unit and a transmission interface of the signal amplification device, and is configured to convert the second control instruction generated by the signal amplification control unit into a second transmission signal and send the second transmission signal to the transmission interface of the signal amplification device, or receive a first transmission signal from the transmission interface of the signal amplification device, convert the first transmission signal into the first control instruction, and send the first control instruction to the signal amplification control unit, and the transmission interface of the signal amplification device is configured to be connected to a transmission interface of the signal transceiving device through a cable.

According to an embodiment of the present disclosure, the radio frequency interface connected to the power amplifier and the radio frequency interface connected to the low noise amplifier are a same radio frequency interface.

According to an embodiment of the present disclosure, a switching unit is provided between the power amplifier and the low noise amplifier, and the radio frequency interface; in a case where the signal amplification control unit receives the first control instruction, the signal amplification control unit controlling the power amplifier to receive the first radio frequency signal from the radio frequency interface of the signal amplification device according to the first control instruction includes: controlling the switching unit to connect the radio frequency interface of the signal amplification device to the power amplifier; and in a case where the low noise amplifier receives the second radio frequency signal from the antenna, the signal amplification controlling unit controlling the low noise amplifier to send the second radio frequency signal to the radio frequency interface of the signal amplification device according to the second control instruction includes: controlling the switching unit to connect the radio frequency interface of the signal amplification device to the low noise amplifier.

According to an embodiment of the present disclosure, the signal amplification control unit generating the second control instruction includes: determining second time when controlling the low noise amplifier to send the second radio frequency signal to the radio frequency interface of the signal amplification device, and generating the second control instruction according to a second time difference between the second time and a basic pulse.

According to an embodiment of the present disclosure, the second control signal unit converting the second control instruction generated by the signal amplification control unit into the second transmission signal and sending the second transmission signal to the transmission interface of the signal amplification device includes: determining a second applied voltage value according to the second control instruction generated by the signal amplification control unit; and applying a second direct current bias voltage with the second applied voltage value to a cable connected to the transmission interface of the signal amplification device, so as to send the second direct current bias voltage to the transmission interface of the signal amplification device as the second transmission signal.

According to an embodiment of the present disclosure, the second control signal unit converting the second control instruction generated by the signal amplification control unit into the second transmission signal and sending the second transmission signal to the transmission interface of the signal amplification device includes: converting the second control instruction generated by the signal amplification control unit into the second transmission signal, and sending the second transmission signal by the second control signal unit to the transmission interface of the signal amplification device at least a predetermined transmission delay ahead of the signal amplification control unit controlling the low noise amplifier to send the second radio frequency signal according to the second control instruction.

In the third aspect, the present disclosure discloses an operation method of a communication system including the signal transceiving device and the signal amplification device as described above, wherein the radio frequency interface of the signal transceiving device is connected to the radio frequency interface of the signal amplification device through a cable, the transmission interface of the signal transceiving device is connected to the transmission interface of the signal amplification device through a cable, and the operation method includes at least one of a transmission process and a reception process with respect to the signal transceiving device, and the transmission process includes: the signal transmission-reception control unit generates the first control instruction and controls the radio frequency signal transceiving unit to send the first radio frequency signal to the power amplifier according to the first control instruction; the first control signal unit converts the first control instruction generated by the signal transmission-reception control unit into the first transmission signal and sends the first transmission signal to the second control signal unit; the second control signal unit receives the first transmission signal from the first control signal unit, converts the first transmission signal into the first control instruction, and sends the first control instruction to the signal amplification control unit; and the signal amplification control unit receives the first control instruction and controls the power amplifier to receive the first radio frequency signal from the radio frequency signal transceiving unit according to the first control instruction.

According to an embodiment of the present disclosure, the reception process includes: the signal amplification control unit generates the second control instruction and controls the low noise amplifier to send the second radio frequency signal according to the second control instruction; the second control signal unit converts the second control instruction generated by the signal amplification control unit into the second transmission signal and sends the second transmission signal to the first control signal unit; the first control signal unit receives the second transmission signal from the second control signal unit, converts the second transmission signal into the second control instruction, and sends the second control instruction to the signal transmission-reception control unit; and the signal transmission-reception control unit receives the second control instruction and controls the radio frequency signal transceiving unit to receive the second radio frequency signal from the low noise amplifier according to the second control instruction.

DETAIL DESCRIPTION OF EMBODIMENTS

Figure 1:
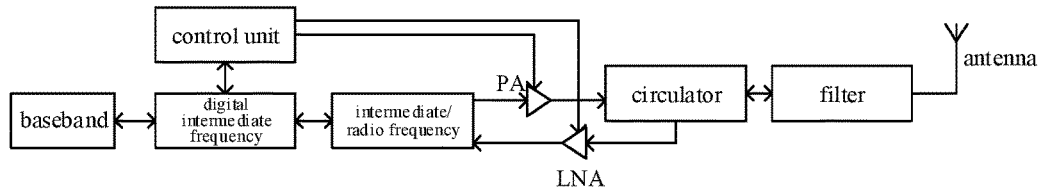
FIG. 1 is a schematic structural diagram of a signal transceiving device in the related technology.

In order to enable those of ordinary skill in the art to better understand the technical solutions of the embodiments of the present disclosure, a signal transceiving device, a signal amplification device, and an operation method of a communication system provided by the embodiments of the present disclosure are described in detail below with reference to the drawings.

The embodiments of the present disclosure will be described more fully below with reference to the drawings, but the embodiments illustrated herein may be embodied in different forms, and should not be interpreted as being limited to embodiments described herein. Rather, the embodiments are provided to make the present disclosure thorough and complete, and are intended to enable those of ordinary skill in the art to fully understand the scope of the present disclosure.

The drawings for the embodiments of the present disclosure are intended to provide a further understanding of the embodiments of the present disclosure and constitute a part of the specification. Together with the embodiments of the present disclosure, the drawings are used to explain the embodiments of the present disclosure, but do not constitute any limitation to the present disclosure. The above features and advantages and other features and advantages will become more apparent to those of ordinary skill in the art from the description of exemplary embodiments with reference to the drawings.

The embodiments of the present disclosure can be described with reference to plans and/or cross-sectional views with the aid of idealized schematic diagrams of the present disclosure. Accordingly, the exemplary drawings may be modified according to manufacturing techniques and/or tolerances.

The embodiments described herein and the features therein can be arbitrarily combined with one another if no conflict is incurred.

The terms used herein are merely used to describe specific embodiments, and are not intended to limit the present disclosure. The term "and/or" used herein includes any and all combinations of one or more associated listed items. As used herein, "a" and "the" which indicate a singular form are intended to include a plural form, unless expressly stated in the context. The terms "comprise" and "be made of" used herein indicate the presence of the described features, integers, operations, elements and/or components, but do not exclude the presence or addition of one or more other features, integers, operations, elements, components and/or combinations thereof.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

The embodiments of the present disclosure are not limited to those illustrated by the drawings, but include modifications to configuration formed based on a manufacturing process. Thus, the regions shown in the drawings are illustrative, and the shapes of the regions shown in the drawings illustrate specific shapes of the regions of the elements, but are not intended to make limitations.

FIG. 1 is a schematic structural diagram of a signal transceiving device in the related technology.

With reference to FIG. 1, the signal transceiving device (also called a transceiver) includes a baseband unit, a digital intermediate frequency unit, an intermediate/radio frequency unit, a PA (Power Amplifier), an LNA (Low Noise Amplifier), a control unit, a circulator, and a filter.

The baseband unit is configured to modulate and convert user data into a baseband signal suitable for transmission, and demodulate the baseband signal to obtain the user data. The user data may be 4G data or 5G data. The baseband unit modulates the user data into the baseband signal by means of Orthogonal Frequency Division Multiplexing (OFDM), and correspondingly demodulates the baseband signal to obtain the 4G data or 5G data by means of OFDM. Apparently, the baseband unit may be replaced with a functional unit capable of converting the user data into the baseband signal and demodulating the baseband signal to obtain the user data, such as a transmission unit, a control unit, a clock unit, or a service high-level unit.

The digital intermediate frequency unit is connected between the baseband unit and the intermediate/radio frequency unit, and is configured to perform intermediate frequency processing on the baseband signal, and the intermediate/radio frequency unit converts the baseband signal subjected to the intermediate frequency processing into a radio frequency signal through digital-to-analog conversion. Correspondingly, the intermediate/radio frequency unit can also convert the radio frequency signal into a digital radio frequency signal through analog-to-digital conversion, and the digital intermediate frequency unit can also convert the digital radio frequency signal into the baseband signal.

The power amplifier and the low noise amplifier are both connected to the intermediate/radio frequency unit. The power amplifier is configured to amplify the radio frequency signal from the intermediate/radio frequency unit, and the low noise amplifier is configured to amplify a signal from an antenna and send the amplified signal to the intermediate/radio frequency unit.

The control unit is connected to the power amplifier and the low noise amplifier, and is configured to control the power amplifier and the low noise amplifier to operate according to a mode of the signal transceiving device. With reference to FIG. 1, the mode of the signal transceiving device is a Time Division Duplexing (TDD) mode: when the signal transceiving device is in a transmitting state, the control unit controls the power amplifier to operate; and when the signal transceiving device is in a receiving state, the control unit controls the low noise amplifier to operate.

The circulator is connected to the power amplifier and the low noise amplifier, the filter is connected between the circulator and the antenna. The circulator is configured to combine a transmitting path from the signal transceiving device to the antenna and a receiving path from the antenna to the signal transceiving device into one path, that is, the circulator enables the transmission of the radio frequency signal amplified by the power amplifier to the antenna and the transmission of the radio frequency signal from the antenna to the low noise amplifier to be performed on one path. The filter is configured to filter the signals (including the radio frequency signal amplified by the power amplifier and the radio frequency signal from the antenna) transmitted on the combined path.

The signal transceiving device may form a satellite ground station together with an external antenna, perform the functions of transmitting signals to a satellite and receiving the signals transmitted by other ground stations through the satellite, and adapt to most application scenarios, thereby being widely applied.

However, since a large number of circuits such as the baseband unit and the digital intermediate frequency unit are digital circuits, which are more sensitive to temperature than analog circuits, operating states of the digital circuits may be affected by an excessive ambient temperature. In addition, due to the problem of power amplification efficiency, the power amplifier is always a device with large power consumption in the signal transceiving device, and heat consumption of the signal transceiving device is increased due to the power amplifier. The higher the transmission power of the power amplifier is, the more the increase in the heat consumption is, and the increase in the heat consumption further causes an increase in the ambient temperature of the space where the signal transceiving device is located. This not only puts forward a higher requirement on heat stress of the components constituting the digital circuits in the signal transceiving device, but also prevents the signal transceiving device from adapting to an application scenario with a strict ambient temperature requirement (such as an application scenario with a relatively high ambient temperature).

Meanwhile, the higher the power of the signal transceiving device is, the greater the heat consumption of the signal transceiving device is, the larger the volume of the heat capacity structure needed by the signal transceiving device is, the larger the volume of the signal transceiving device is. Thus, the signal transceiving device cannot meet the requirements of high power and small volume at the same time, and cannot adapt to an application scenario with a strict volume requirement (such as an application scenario with a limited volume).

Figure 2:
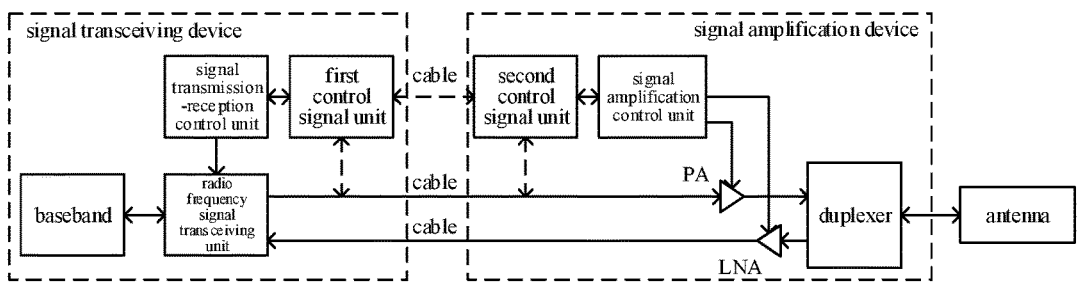
FIG. 2 is a schematic structural diagram of a signal transceiving device and a signal amplification device according to the present disclosure.
Figure 3:
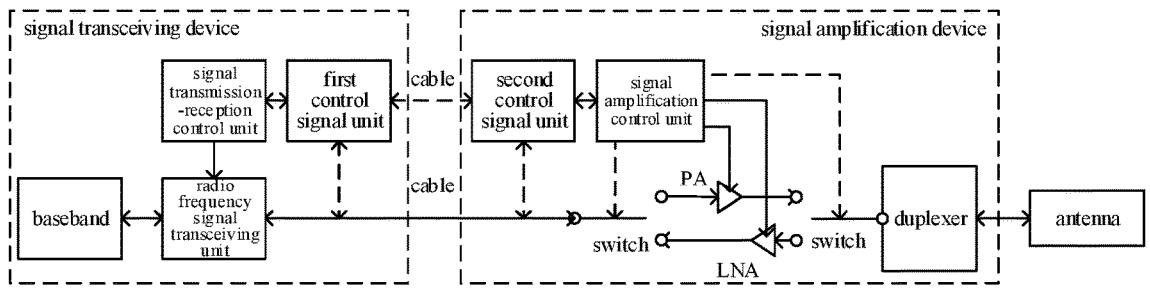
FIG. 3 is another schematic structural diagram of a signal transceiving device and a signal amplification device according to the present disclosure.

FIG. 2 is a schematic structural diagram of a signal transceiving device and a signal amplification device according to the present disclosure. FIG. 3 is another schematic structural diagram of a signal transceiving device and a signal amplification device according to the present disclosure.

With reference to FIG. 2 and FIG. 3, the signal transceiving device according to the present disclosure includes: a radio frequency signal transceiving unit, a signal transmission-reception control unit, and a first control signal unit.

The radio frequency signal transceiving unit is connected between a baseband interface and at least one radio frequency interface, and is configured to generate a first radio frequency signal according to a first baseband signal from the baseband interface, send the first radio frequency signal to the radio frequency interface under the control of the signal transmission-reception control unit, and receive a second radio frequency signal from the radio frequency interface under the control of the signal transmission-reception control unit. The radio frequency interface is configured to be connected to a radio frequency interface of the signal amplification device through a cable.

The signal transmission-reception control unit is connected to the radio frequency signal transceiving unit, and is configured to generate a first control instruction, control the radio frequency signal transceiving unit to send the first radio frequency signal to the radio frequency interface according to the first control instruction, receive a second control instruction sent by the signal amplification device, and control the radio frequency signal transceiving unit to receive the second radio frequency signal from the radio frequency interface according to the second control instruction.

The first control signal unit is connected between the signal transmission-reception control unit and a transmission interface of the signal transceiving device, and is configured to convert the first control instruction generated by the signal transmission-reception control unit into a first transmission signal, send the first transmission signal to the transmission interface of the signal transceiving device, receive a second transmission signal from the transmission interface of the signal transceiving device, convert the second transmission signal into the second control instruction, and send the second control instruction to the signal transmission-reception control unit. The transmission interface of the signal transceiving device is configured to be connected to a transmission interface of the signal amplification device through a cable.

With reference to FIG. 2 and FIG. 3, the signal transceiving device according to the present disclosure may be a base station or Customer Premises Equipment (CPE), and has two states, i.e., a transmitting state and a receiving state. When the signal transceiving device is in the transmitting state, the signal transceiving device may send a signal to a device connected thereto; and when the signal transceiving device is in the receiving state, the signal transceiving device may receive a signal from the device connected thereto.

The radio frequency signal transceiving unit is connected between the baseband interface and the radio frequency interface, is connected to a baseband unit through the baseband interface, and is connected to the signal amplification device through the radio frequency interface. When the signal transceiving device is in the transmitting state, the radio frequency signal transceiving unit receives the first baseband signal from the baseband unit through the baseband interface, converts the first baseband signal into the first radio frequency signal, and sends the first radio frequency signal to the signal amplification device through the radio frequency interface under the control of the signal transmission-reception control unit. Correspondingly, when the signal transceiving device is in the receiving state, the radio frequency signal transceiving unit receives the second radio frequency signal from the signal amplification device through the radio frequency interface under the control of the signal transmission-reception control unit, converts the second radio frequency signal into a second baseband signal, and sends the second baseband signal to the baseband unit through the baseband interface.

The signal transmission-reception control unit is connected to the radio frequency signal transceiving unit. When the signal transceiving device is in the transmitting state, the signal transmission-reception control unit generates the first control instruction for synchronization with operation of the signal amplification device, and controls the radio frequency signal transceiving unit to send the first radio frequency signal to the signal amplification device according to the first control instruction while sending the generated first control instruction to the first control signal unit; and when the signal transceiving device is in the receiving state, the signal transmission-reception control unit receives the second control instruction sent by the first control signal unit while controlling the radio frequency signal transceiving unit to receive the second radio frequency signal from the signal amplification device according to the received second control instruction.

The first control signal unit is connected between the signal transmission-reception control unit and the transmission interface of the signal transceiving device, and is connected to the signal amplification device through the transmission interface. When the signal transceiving device is in the transmitting state, the first control signal unit receives the first control instruction generated by the signal transmission-reception control unit, converts the first control instruction into the first transmission signal, and sends the first transmission signal to the signal amplification device. When the signal transceiving device is in the receiving state, the first control signal unit receives the second transmission signal from the signal amplification device, converts the second transmission signal into the second control instruction, and sends the second control instruction to the signal transmission-reception control unit.

A baseband signal is a signal obtained by modulating user data with the baseband unit, and the signal transceiving device according to the present disclosure may further include the baseband unit, which is configured to modulate first user data into the first baseband signal, and demodulate, after receiving the second baseband signal sent by the radio frequency signal transceiving unit, the second baseband signal to obtain second user data. The user data may be 4G data or 5G data, and the baseband unit modulates the user data into the baseband signal by means of OFDM, and correspondingly demodulates the baseband signal to obtain the 4G data or the 5G data by means of OFDM.

The signal transmission-reception control unit may send not only the first control instruction to the signal amplification device through the first signal control unit, but also other information through the first signal control unit, for example, the other information may be the information acquired by measurement such as user heartbeat and an indoor temperature, the information acquired by query such as user assets, and the information needed for system operation such as alarm information and the latest version of system software.

The radio frequency signal transceiving unit and the first control signal unit are connected to the same signal amplification device, which is a device capable of amplifying a radio frequency signal and sending the amplified radio frequency signal to an antenna, and the signal amplification device may be the signal amplification device according to the present disclosure. The radio frequency signal transceiving unit is connected to a power amplifier and a low noise amplifier of the signal amplification device through the radio frequency interface, and the first control signal unit is connected to a second control signal unit of the signal amplification device through the transmission interface.

The radio frequency signal transceiving unit is connected to the signal amplification device through the radio frequency interface, and the radio frequency interface is connected to the signal amplification device through the cable, that is, the radio frequency signal transceiving unit is connected to the signal amplification device through the cable. Similarly, the first control signal unit is also connected to the signal amplification device through a cable. That is, the signal transceiving device and the signal amplification device according to the present disclosure are two independent devices connected to each other through cables.

Since the signal transceiving device and the signal amplification device are connected to each other through the cables, a certain transmission delay may exist in the transmission of the radio frequency signals. In order to ensure synchronization of the transmission and reception of the signal transceiving device with the transmission and reception of the signal amplification device, the signal transmission-reception control unit needs to "negotiate" with a signal amplification control unit of the signal amplification device, that is, sending the first control instruction or receiving the second control instruction through the first control signal unit.

By connecting the signal transceiving device according to the present disclosure to the signal amplification device through the cables, the devices for signal amplification (such as the power amplifier and the low noise amplifier) can be removed from the signal transceiving device. On the one hand, with the high-power devices such as the power amplifier removed, heat consumption of the signal transceiving device is greatly reduced, and an ambient temperature of the space where the signal transceiving device is located is reduced, so that the signal transceiving device can adapt to the application scenario with a relatively high ambient temperature. On the other hand, with the devices for signal amplification (such as the power amplifier and the low noise amplifier) removed from the signal transceiving device, a volume of the signal transceiving device is accordingly reduced, a volume of a heat capacity structure needed by the signal transceiving device is reduced due to the reduction of the heat consumption of the signal transceiving device, and the volume of the signal transceiving device is correspondingly reduced. Thus, the signal transceiving device can adapt to the application scenario with the strict volume requirement (such as the application scenario with the limited volume).

Since the radio frequency signal transceiving unit and the first control signal unit, which are connected to the signal amplification device, are both connected to the signal amplification device through the cables, the signal amplification device can be disposed in the space far away from the signal transceiving device, for example, the signal amplification device can be disposed at an antenna side.

When the signal amplification device is disposed at the antenna side, a loss of a feed line from the signal amplification device to the antenna can be greatly reduced, so that the signal amplification device can amplify the signals with a smaller amplification factor, which can greatly reduce heat consumption of the signal amplification device. Meanwhile, since a volume of the signal amplification device is much smaller than volumes of other devices at the antenna side, an increase in the space at the antenna side after the signal amplification device is disposed at the antenna side is negligible compared with the space originally occupied by the other devices at the antenna side.

According to an embodiment of the present disclosure, the radio frequency interface and the transmission interface are an integral structure.

According to an embodiment of the present disclosure, the radio frequency interface and the transmission interface may be connected to the signal amplification device through the same cable, as shown by the dotted lines in FIG. 2 and FIG. 3. In addition, the first signal control unit is connected to the cable through which the radio frequency signal transceiving unit is connected to the signal amplification device through another line.

When the radio frequency interface and the transmission interface are connected to the signal amplification device through the same cable, that is, when the radio frequency signal and the transmission signal are sent to the signal amplification device through the same cable, the transmission signal may be a signal capable of being transmitted through the same path as the radio frequency signal, such as a Radio Frequency (RF) signal, an Amplitude Modulation (AM) signal, a Frequency Modulation (FM) signal, a Phase Modulation (PM) signal, or an On-Off-Keying (OOK) signal.

By connecting the radio frequency interface and the transmission interface to the signal amplification device through the same cable, that is, by sending the radio frequency signal and the transmission signal to the signal amplification device through the same cable, the use of cable can be reduced, and a transmission cost can be saved.

According to an embodiment of the present disclosure, the radio frequency interface and the transmission interface may also be connected to the signal amplification device through different cables, as shown by the solid lines in FIG. 2 and FIG. 3. When the radio frequency interface and the transmission interface are connected to the signal amplification device through the different cables, the transmission interface is a physical interface different from the radio frequency interface, such as a serial port or a network interface, and the transmission signal is transmitted on a dedicated physical line different from a transmission line of the radio frequency signal, and may be a protocol signal, such as a Universal Asynchronous Receiver/Transmitter (UART) signal, a High Level Data Link Control (HDLC) signal, or an Ethernet (ETH) signal.

According to an embodiment of the present disclosure, the radio frequency signal transceiving unit is configured to send the first radio frequency signal to a first radio frequency interface and receive the second radio frequency signal from a second radio frequency interface.

With reference to FIG. 2, when an operating mode of the signal transceiving device is a Frequency Division Duplexing (FDD) mode or a full-duplex mode, since different frequencies are used when the first radio frequency signal is sent to the signal amplification device and the second radio frequency signal is received from the signal amplification device, the radio frequency signal transceiving unit needs to be connected to the signal amplification device through two different cables via two different radio frequency interfaces (i.e., the first radio frequency interface and the second radio frequency interface), and the radio frequency signal transceiving unit is configured to send the first radio frequency signal to the signal amplification device via the first radio frequency interface and receive the second radio frequency signal from the signal amplification device via the second radio frequency interface.

When the signal amplification device is the signal amplification device according to the present disclosure, the radio frequency signal transceiving unit is connected to the power amplifier in the signal amplification device through one cable, and is in signal connection with the low noise amplifier in the signal amplification device through the other cable; when the signal transceiving device is in the transmitting state, the cable connected to the power amplifier operates to send the first radio frequency signal to the signal amplification device; and when the signal transceiving device is in the receiving state, the cable connected to the low noise amplifier operates to receive the second radio frequency signal from the signal amplification device.

With reference to FIG. 3, when the operating mode of the signal transceiving device is the TDD mode, since the same frequency is used when sending the radio frequency signal to the signal amplification device and when receiving the radio frequency signal from the signal amplification device, the radio frequency signal transceiving unit may be connected to the signal amplification device via one radio frequency interface through one cable.

When the signal amplification device is the signal amplification device according to the present disclosure, the radio frequency signal transceiving unit is in signal connection with the power amplifier and the low noise amplifier in the signal amplification device through one cable, and switching between a path from the signal transceiving device to the signal amplification device and a path from the signal amplification device to the signal transceiving device is realized through the control of the first control signal unit on the radio frequency signal transceiving unit and the control of the second control signal unit on the power amplifier and the low noise amplifier.

According to an embodiment of the present disclosure, the signal transmission-reception control unit generating the first control instruction includes that: the signal transmission-reception control unit determines first time when controlling the radio frequency signal transceiving unit to send the first radio frequency signal to the radio frequency interface, and generates the first control instruction according to a first time difference between the first time and a basic pulse.

When the signal transceiving device is in the transmitting state, the signal transmission-reception control unit generating the first control instruction for synchronization with operation of the signal amplification device includes that: after determining the first time when the radio frequency signal transceiving unit sends the first radio frequency signal to the signal amplification device, the signal transmission-reception control unit takes the first time difference between the first time and the basic pulse as the first control instruction, and sends the first control instruction to the signal amplification device through the first control signal unit. Both the signal transmission-reception control unit and the signal amplification device control the transmission and the reception of the first radio frequency signal based on the basic pulse and the first time difference in the first control instruction.

The basic pulse may be acquired by sending a periodic instruction by the signal transceiving device to the signal amplification device, for example, the basic pulse may be acquired by sending the periodic instruction by the first control signal unit to the signal amplification device, so as to ensure that the signal transceiving device and the signal amplification device may generate the same basic pulse.

When the signal amplification device is the signal amplification device according to the present disclosure, correspondingly, when the signal transceiving device is in the receiving state, that is, when the signal amplification device is in the transmitting state, after the signal amplification control unit of the signal amplification device determines second time when the second radio frequency signal is sent to the radio frequency signal transceiving unit of the signal transceiving device, the signal amplification control unit takes a second time difference between the second time and the basic pulse as the second control instruction, and sends the second control instruction to the signal transceiving device through the second control signal unit. The signal amplification control unit controls the transmission of the second radio frequency signal based on the basic pulse and the second time difference in the second control instruction, and the signal transmission-reception control unit controls the reception of the second radio frequency signal based on the basic pulse and the second time difference in the second control instruction.

By generating the first control instruction according to the first time difference between the first time and the basic pulse and accordingly controlling the transmission and the reception of the first radio frequency signal, and by generating the second control instruction according to the second time difference between the second time and the basic pulse and accordingly controlling the transmission and the reception of the second radio frequency signal, the synchronization of the transmission and reception of the signal transceiving device with the transmission and reception of the signal amplification device can be ensured, that is, when the signal transceiving device is in the transmitting state, the signal amplification device is in the receiving state and can receive the first radio frequency signal sent by the signal transceiving device; and when the signal transceiving device is in the receiving state, the signal amplification device is in the transmitting state, and the signal transceiving device can receive the second radio frequency signal sent by the signal amplification device.

According to an embodiment of the present disclosure, the first control signal unit converting the first control instruction generated by the signal transmission-reception control unit into the first transmission signal and sending the first transmission signal to the transmission interface includes: determining a first applied voltage value according to the first control instruction generated by the signal transmission-reception control unit; and applying a first direct current bias voltage with the first applied voltage value to the cable connected to the transmission interface to send the first transmission signal to the transmission interface.

When the signal transceiving device is in the transmitting state, the first control signal unit converting the first control instruction into the first transmission signal and sending the first transmission signal to the signal amplification device includes that: the first control signal unit determines the first applied voltage value (e.g., a first preset value) according to the first control instruction, and applies the first direct current bias voltage with the first preset value to the cable (i.e., the cable through which the first signal control unit is connected to the signal amplification device), so as to send the first direct current bias voltage to the signal amplification device as the first transmission signal.

The first preset value indicates that the signal transceiving device is in the transmitting state, and the signal amplification device switches to the receiving state when receiving the first direct current bias voltage with the first preset value as the first transmission signal.

Both the signal transceiving device and the signal amplification device have a direct current isolation function, and are capable of separating direct current signals. Thus, when receiving the transmission signal with the addition of the direct current bias voltage, the signal transceiving device or the signal amplification device can separate a direct current signal from the transmission signal, obtain the voltage value of the direct current bias voltage, and switch between the transmitting state and the receiving state according to the voltage value.

When the signal amplification device is the signal amplification device according to the present disclosure, correspondingly, when the signal transceiving device is in the receiving state, that is, when the signal amplification device is in the transmitting state, the second control signal unit of the signal amplification device converting the second control instruction into the second transmission signal and sending the second transmission signal to the signal transceiving device includes that: the second control signal unit determines a second applied voltage value (e.g., a second preset value) according to the second control instruction, and applies a second direct current bias voltage with the second preset value to the cable (i.e., the cable through which the first signal control unit is connected to the signal amplification device), so as to send the second direct current bias voltage to the signal transceiving device as the second transmission signal.

The second preset value is a value different from the first preset value, and indicates that the signal amplification device is in the transmitting state. The signal transceiving device switches to the receiving state when receiving the second direct current bias voltage with the second preset value as the second transmission signal.

That is, in the transmission process of the first transmission signal or the second transmission signal, the first direct current bias voltage or the second direct current bias voltage is respectively applied to the cable (i.e., the cable through which the first signal control unit is connected to the signal amplification device) through which the first transmission signal and the second transmission signal are transmitted, and the direct current bias voltages with the different voltage values represent the states (e.g., the receiving state, the transmitting state, and an idle state) of the signal transceiving device and the signal amplification device.

The different voltage values of the direct current bias voltages are used to represent the different states of the signal transceiving device and the signal amplification device, and the signal transceiving device or the signal amplification device switches its own state to a corresponding state according to the value of the direct current bias voltage when detecting the value of the direct current bias voltage, thus achieving the synchronization of the transmission and reception of the signal transceiving device with the transmission and reception of the signal amplification device.

According to an embodiment of the present disclosure, the first control signal unit converting the first control instruction generated by the signal transmission-reception control unit into the first transmission signal and sending the first transmission signal to the signal amplification device includes that: the first control signal unit converts the first control instruction generated by the signal transmission-reception control unit into the first transmission signal, and sends the first transmission signal to the transmission interface at least a predetermined transmission delay ahead of the signal transmission-reception control unit controlling the radio frequency signal transceiving unit to send the first radio frequency signal according to the first control instruction.

After the first control signal unit converts the first control instruction generated by the signal transmission-reception control unit into the first transmission signal, according to the predetermined (e.g., pre-measured) transmission delay between the signal transceiving device and the signal amplification device (the transmission delay between the first control signal unit in the signal transceiving device and the second control signal unit in the signal amplification device), the first control signal unit needs to send the first transmission signal to the second control signal unit of the signal amplification device at least the transmission delay ahead of the signal transmission-reception control unit controlling the radio frequency signal transceiving unit to send the first radio frequency signal according to the first control instruction.

Sending the first transmission signal in advance can avoid the problem that the signal amplification device fails to receive the first radio frequency signal because the signal amplification device already cannot timely receive the first radio frequency signal according to the first control instruction due to the transmission delay when the first transmission signal generated by the signal transceiving device arrives at the signal amplification device.

When the signal amplification device is the signal amplification device according to the present disclosure, correspondingly, after the second control signal unit converts the second control instruction generated by the signal amplification control unit into the second transmission signal, according to a pre-measured transmission delay between the signal transceiving device and the signal amplification device (specifically, the transmission delay between the first control signal unit in the signal transceiving device and the second control signal unit in the signal amplification device), the second control signal unit needs to send the second transmission signal to the first control signal unit of the signal transceiving device at least the transmission delay ahead of the signal amplification control unit controlling the low noise amplifier to send the second radio frequency signal according to the second control instruction.

Similar to the signal transceiving device sending the first transmission signal in advance, the signal amplification device sending the second transmission signal in advance by the transmission delay can avoid the problem that the signal transceiving device fails to receive the second radio frequency signal because the signal transceiving device already cannot timely receive the second radio frequency signal according to the second control instruction due to the transmission delay when the second transmission signal generated by the signal amplification device arrives at the signal transceiving device.

With reference to FIG. 2 and FIG. 3, the signal amplification device according to the present disclosure includes: the power amplifier, the low noise amplifier, the signal amplification control unit, and the second control signal unit.

The power amplifier is connected between the antenna and a radio frequency interface of the signal amplification device, and is configured to receive the first radio frequency signal from the radio frequency interface of the signal amplification device under the control of the signal amplification control unit, amplify the first radio frequency signal, and then send the amplified first radio frequency signal to the antenna. The radio frequency interface of the signal amplification device is configured to be connected to the radio frequency interface of the signal transceiving device through a cable.

The low noise amplifier is connected between the antenna and a radio frequency interface of the signal amplification device, and is configured to receive a second radio frequency signal from the antenna, amplify the second radio frequency signal, and send the amplified second radio frequency signal (also referred to as the second radio frequency signal herein for short) to the radio frequency interface of the signal amplification device under the control of the signal amplification control unit. The radio frequency interface of the signal amplification device is configured to be connected to the radio frequency interface of the signal transceiving device through a cable.

The signal amplification control unit is connected to the power amplifier and the low noise amplifier, and is configured to receive the first control instruction and control the power amplifier to receive the first radio frequency signal from the radio frequency interface of the signal amplification device according to the first control instruction, or is configured to generate the second control instruction and control the low noise amplifier to send the second radio frequency signal to the radio frequency interface of the signal amplification device according to the second control instruction.

The second control signal unit is connected between the signal amplification control unit and a transmission interface of the signal amplification device, and is configured to convert the second control instruction generated by the signal amplification control unit into the second transmission signal and send the second transmission signal to the transmission interface of the signal amplification device, or is configured to receive the first transmission signal from the transmission interface of the signal amplification device, convert the first transmission signal into the first control instruction, and send the first control instruction to the signal amplification control unit. The transmission interface of the signal amplification device is configured to be connected to the transmission interface of the signal transceiving device through a cable.

With reference to FIG. 2 and FIG. 3, the signal amplification device according to the present disclosure also has two states, i.e., the transmitting state and the receiving state, the transmitting state of the signal amplification device corresponds to the receiving state of the signal transceiving device, and the receiving state of the signal amplification device corresponds to the transmitting state of the signal transceiving device. The signal amplification device may be connected between the signal transceiving device (e.g., the base station, or the CPE) and the antenna. When the signal amplification device is in the transmitting state, the signal amplification device may process the second radio frequency signal from the antenna and send the processed second radio frequency signal (also referred to the second radio frequency signal herein for short) to the signal transceiving device. When the signal amplification device is in the receiving state, the signal amplification device may receive the first radio frequency signal from the signal transceiving device, process the first radio frequency signal, and send the processed first radio frequency signal to the antenna.

The power amplifier is connected between the radio frequency interface and the antenna, and is connected to the signal transceiving device through the radio frequency interface. When the signal amplification device is in the receiving state, the power amplifier receives the first radio frequency signal from the signal transceiving device through the radio frequency interface, amplifies the received first radio frequency signal, and then sends the amplified first radio frequency signal to the antenna.

The low noise amplifier is also connected between the radio frequency interface and the antenna, and is also connected to the signal transceiving device through the radio frequency interface. When the signal amplification device is in the transmitting state, the low noise amplifier receives the second radio frequency signal from the antenna, amplifies the received second radio frequency signal, and then sends the amplified second radio frequency signal to the radio frequency signal transceiving unit.

The signal amplification control unit is connected to the power amplifier and the low noise amplifier. When the signal amplification device is in the transmitting state, the signal amplification control unit generates the second control instruction for synchronization with operation of the signal transceiving device, and controls the low noise amplifier to send the second radio frequency signal to the signal transceiving device according to the second control instruction while sending the generated second control instruction to the second control signal unit; and when the signal amplification device is in the receiving state, the signal amplification control unit receives the first control instruction sent by the first control signal unit while controlling the power amplifier to receive the first radio frequency signal from the signal transceiving device according to the received first control instruction.

The second control signal unit is connected between the signal amplification control unit and the transmission interface, and is connected to the signal transceiving device through the transmission interface. When the signal amplification device is in the transmitting state, the second control signal unit receives the second control instruction generated by the signal amplification control unit, converts the second control instruction into the second transmission signal, and transmits the second transmission signal to the signal transceiving device; and when the signal amplification device is in the receiving state, the second control signal unit receives the first transmission signal from the signal transceiving device, converts the first transmission signal into the first control instruction, and sends the first control instruction to the signal amplification control unit.

Similar to the signal transceiving device according to the present disclosure, the signal amplification control unit may send not only the second control instruction to the signal transceiving device through the second signal control unit, but also other information through the second signal control unit, for example, the other information may be the information acquired by measurement such as user heartbeat and an indoor temperature, the information acquired by query such as user assets, and the information needed for system operation such as alarm information and the latest version of system software.

A duplexer (or a circulator) and a filter may be further provided between the power amplifier and the low noise amplifier, and the antenna, with the duplexer connected to the power amplifier and the low noise amplifier and the filter connected between the duplexer and the antenna. The duplexer is configured to combine a transmitting path from the signal amplification device to the antenna and a receiving path from the antenna to the signal amplification device into one path, that is, the duplexer enables the transmission of the first radio frequency signal amplified by the power amplifier to the antenna and the transmission of the second radio frequency signal from the antenna to the low noise amplifier to be performed on one path. The filter is configured to filter the signals (including the first radio frequency signal amplified by the power amplifier and the second radio frequency signal from the antenna) transmitted on the combined path.

The power amplifier, the low noise amplifier, and the second control signal unit are connected to the same signal transceiving device, which is a device capable of converting the second radio frequency signal into the second baseband signal, and sending the second baseband signal to the baseband unit to allow the baseband unit to convert the second baseband signal into the second user data, and the signal transceiving device may be the signal transceiving device according to the present disclosure. The power amplifier and the low noise amplifier are connected to the radio frequency signal transceiving unit of the signal transceiving device through the radio frequency interfaces, and the second control signal unit is connected to the first control signal unit of the signal transceiving device through the transmission interface.

The power amplifier and the low noise amplifier are connected to the signal transceiving device through the radio frequency interfaces, and the radio frequency interfaces are connected to the signal transceiving device through the cables, that is, the power amplifier and the low noise amplifier are connected to the signal transceiving device through the cables. Similarly, the second control signal unit is also connected to the signal transceiving device through the cable.

By connecting the signal amplification device according to the present disclosure to the signal transceiving device through the cables, the devices for signal amplification (such as the power amplifier and the low noise amplifier) can be removed from the signal transceiving device. On the one hand, with the high-power devices such as the power amplifier removed, heat consumption of the signal transceiving device is greatly reduced, and an ambient temperature of the space where the signal transceiving device is located is reduced, so that the signal transceiving device can adapt to the application scenario with a relatively high ambient temperature. On the other hand, with the devices for signal amplification (such as the power amplifier and the low noise amplifier) removed from the signal transceiving device, a volume of the signal transceiving device is accordingly reduced, a volume of a heat capacity structure needed by the signal transceiving device is reduced due to the reduction of the heat consumption of the signal transceiving device, and the volume of the signal transceiving device is correspondingly reduced. Thus, the signal transceiving device can adapt to the application scenario with the strict volume requirement (such as the application scenario with the limited volume).

Since the radio frequency signal transceiving unit and the first control signal unit, which are connected to the signal amplification device, are both connected to the signal amplification device through the cables, the signal amplification device can be disposed in the space far away from the signal transceiving device, for example, the signal amplification device can be disposed at an antenna side.

When the signal amplification device is disposed at the antenna side, a loss of a feed line from the signal amplification device to the antenna can be greatly reduced, so that the signal amplification device can amplify the signals with a smaller amplification factor, which can greatly reduce heat consumption of the signal amplification device. Meanwhile, since a volume of the signal amplification device is much smaller than volumes of other devices at the antenna side, an increase in the space at the antenna side after the signal amplification device is disposed at the antenna side is negligible compared with the space originally occupied by the other devices at the antenna side.

According to an embodiment of the present disclosure, the radio frequency interface connected to the power amplifier and the radio frequency interface connected to the low noise amplifier are the same radio frequency interface.

According to an embodiment of the present disclosure, a switching unit is provided between the power amplifier and the low noise amplifier, and the radio frequency interface.

In a case where the signal amplification control unit receives the first control instruction, the signal amplification control unit controlling the power amplifier to receive the first radio frequency signal from the radio frequency interface according to the first control instruction includes: controlling the switching unit to connect the radio frequency interface to the power amplifier.

In a case where the low noise amplifier receives the second radio frequency signal from the antenna, the signal amplification control unit controlling the low noise amplifier to send the second radio frequency signal to the radio frequency interface according to the second control instruction includes: controlling the switching unit to connect the radio frequency interface to the low noise amplifier.

With reference to FIG. 2, when both the operating mode of the signal transceiving device and an operating mode of the signal amplification device are the FDD mode or the full-duplex mode, since different frequencies are used when the second radio frequency signal is sent to the signal transceiving device and the first radio frequency signal is received from the signal transceiving device, the power amplifier and the low noise amplifier need to be connected to the signal transceiving device through different cables, with one cable used for the transmission of the second radio frequency signal to the signal transceiving device, and the other used for the reception of the first radio frequency signal from the signal transceiving device.

When the signal transceiving device is the signal transceiving device according to the present disclosure, the radio frequency signal transceiving unit is connected to the power amplifier through one cable, and is in signal connection with the low noise amplifier through the other cable; when the signal amplification device is in the transmitting state, the cable through which the low noise amplifier is connected to the radio frequency signal transceiving unit operates to transmit the second radio frequency signal to the signal transceiving device; and when the signal amplification device is in the receiving state, the cable through which the power amplifier is connected to the radio frequency signal transceiving unit operates to receive the first radio frequency signal from the signal transceiving device.

With reference to FIG. 3, when the operation mode of the signal transceiving device is the TDD mode, since the same frequency is used when the second radio frequency signal is sent to the signal transceiving device and when the first radio frequency signal is received from the signal transceiving device, the power amplifier and the low noise amplifier may be connected to the signal transceiving device through one cable.

When the signal transceiving device is the signal transceiving device according to the present disclosure, the power amplifier and the low noise amplifier are connected to the radio frequency signal transceiving unit through the same radio frequency interface. Switching between the path from the signal transceiving device to the signal amplification device (i.e. a path from the radio frequency signal transceiving unit to the power amplifier) and the path from the signal amplification device to the signal transceiving device (i.e. a path from the low noise amplifier to the radio frequency signal transceiving unit) may be realized by disposing the switching unit (such as a switch) between the power amplifier and the low noise amplifier, and the radio frequency interface and controlling on and off of the power amplifier and the low noise amplifier.

That is, when the signal amplification device is in the transmitting state, the signal amplification control unit controls the power amplifier to be powered off while controlling the switch to be in an off state (that is, a path from the radio frequency interface to the power amplifier and a path from the radio frequency interface to the low noise amplifier are both disconnected); after the power amplifier is powered off, the signal amplification control unit controls the switch to be in an on state; when the switched is in the on state under the control (that is, both the path from the radio frequency interface to the power amplifier and the path from the radio frequency interface to the low noise amplifier are connected), the signal amplification control unit controls the low noise amplifier to be powered on and send the second radio frequency signal to the signal transceiving device. At this time, since the power amplifier is powered off and the low noise amplifier is powered on, the power amplifier cannot operate, that is, the radio frequency interface is not connected to the power amplifier, while the low noise amplifier operates normally, that is, the low noise amplifier is connected to the radio frequency interface.

When the signal amplification device is in the receiving state, the signal amplification control unit controls the low noise amplifier to be powered off while controlling the switch to be in the off state; after the low noise amplifier is powered off, the signal amplification control unit controls the switch to be in the on state; and when the switch is in the on state under the control, the signal amplification control unit controls the power amplifier to be powered on and receive the first radio frequency signal from the signal transceiving device. At this time, since the low noise amplifier is powered off and the power amplifier is powered on, the low noise amplifier cannot operate, that is, the radio frequency interface is not connected to the low noise amplifier, while the power amplifier operates normally, that is, the power amplifier is connected to the radio frequency interface.

By disposing the switch between the power amplifier and the low noise amplifier, and the radio frequency interface to realize the switching between the receiving state and the transmitting state of the signal amplification device, the circuit is simple in design and is easy to implement.

According to an embodiment of the present disclosure, the signal amplification control unit generating the second control instruction includes: determining second time when controlling the low noise amplifier to send the second radio frequency signal to the radio frequency interface, and generating the second control instruction according to a second time difference between the second time and the basic pulse.

When the signal amplification device is in the transmitting state, after the signal amplification control unit of the signal amplification device determines the second time when controlling the low noise amplifier to send the second radio frequency signal to the radio frequency signal transceiving unit, the signal amplification control unit takes the second time difference between the second time and the basic pulse as the second control instruction, and sends the second control instruction to the signal transceiving device through the second control signal unit. The signal amplification control unit controls the low noise amplifier to send the second radio frequency signal based on the basic pulse and the second time difference in the second control instruction, and the signal transmission-reception control unit controls the reception of the second radio frequency signal based on the basic pulse and the second time difference in the second control instruction.

When the signal amplification device is in the receiving state, that is, when the signal transceiving device is in the transmitting state, after the signal transceiving device determines the first time when the radio frequency signal transceiving unit sends the first radio frequency signal to the signal amplification device, the first time difference between the first time and the basic pulse is taken as the first control instruction, and the first control instruction is sent to the signal amplification device through the first control signal unit. The signal transmission-reception control unit controls the transmission of the first radio frequency signal based on the basic pulse and the first time difference in the first control instruction, and the signal amplification device controls the reception of the first radio frequency signal based on the basic pulse and the first time difference in the first control instruction.

By generating the first control instruction according to the first time difference between the first time and the basic pulse and accordingly controlling the transmission and reception of the first radio frequency signal, and by generating the second control instruction according to the second time difference between the second time and the basic pulse and accordingly controlling the transmission and reception of the second radio frequency signal, the synchronization of the transmission and reception of the signal transceiving device with the transmission and reception of the signal amplification device can be ensured, that is, when the signal transceiving device is in the transmitting state, the signal amplification device is in the receiving state and can receive the first radio frequency signal sent by the signal transceiving device; and when the signal transceiving device is in the receiving state, the signal amplification device is in the transmitting state, and the signal transceiving device can receive the second radio frequency signal sent by the signal amplification device.

According to an embodiment of the present disclosure, the second control signal unit converting the second control instruction generated by the signal amplification control unit into the second transmission signal and sending the second transmission signal to the transmission interface includes: determining a second applied voltage value according to the second control instruction generated by the signal amplification control unit; and applying a second direct current bias voltage with the second applied voltage value to the cable connected to the transmission interface to send the second transmission signal to the transmission interface.

When the signal amplification device is in the transmitting state, the second control signal unit converting the second control instruction into the second transmission signal and sending the second transmission signal to the signal transceiving device includes that: the second control signal unit determines the second applied voltage value (e.g., a second preset value) according to the second control instruction, and applies the second direct current bias voltage with the second preset value to the cable (i.e., the cable through which the first signal control unit is connected to the signal amplification device), so as to send the second direct current bias voltage to the signal transceiving device as the second transmission signal.

The second preset value indicates that the signal amplification device is in the transmitting state, and the signal transceiving device switches to the receiving state when receiving the second direct current bias voltage with the second preset value as the second transmission signal.

When the signal amplification device is in the receiving state, that is, when the signal transceiving device is in the transmitting state, the first control signal unit of the signal transceiving device converting the first control instruction into the first transmission signal and sending the first transmission signal to the signal amplification device includes that: the first control signal unit determines the first applied voltage value (e.g., the first preset value) according to the first control instruction, and applies the first direct current bias voltage with the first preset value to the cable (i.e., the cable through which the first signal control unit is connected to the signal amplification device), so as to send the first direct current bias voltage to the signal amplification device as the first transmission signal.

The first preset value indicates that the signal transceiving device is in the transmitting state, and the signal amplification device switches to the receiving state when receiving the first direct current bias voltage with the first preset value as the first transmission signal.

That is, in the transmission process of the first transmission signal or the second transmission signal, the first direct current bias voltage or the second direct current bias voltage is respectively applied to the cable (i.e., the cable through which the first signal control unit is connected to the signal amplification device) through which the first transmission signal and the second transmission signal are transmitted, and the direct current bias voltages with the different voltage values represent the states (e.g., the receiving state, the transmitting state, and the idle state) of the signal transceiving device and the signal amplification device.

The different voltage values of the direct current bias voltages are configured to represent the different states of the signal transceiving device and the signal amplification device, and the signal transceiving device or the signal amplification device switches its own state to a corresponding state according to the value of the direct current bias voltage when detecting the value of the direct current bias voltage, thus achieving the synchronization of the transmission and reception of the signal transceiving device with the transmission and reception of the signal amplification device.

According to an embodiment of the present disclosure, the second control signal unit converting the second control instruction generated by the signal amplification control unit into the second transmission signal and sending the second transmission signal to the transmission interface includes that: the second control signal unit converts the second control instruction generated by the signal amplification control unit into the second transmission signal, and sends the second transmission signal to the transmission interface at least a predetermined transmission delay ahead of the signal amplification control unit controlling the low noise amplifier to send the second radio frequency signal according to the second control instruction.

After the second control signal unit converts the second control instruction generated by the signal amplification control unit into the second transmission signal, according to the pre-measured transmission delay between the signal transceiving device and the signal amplification device (the transmission delay between the first control signal unit and the second control signal unit), the second control signal unit needs to send the second transmission signal to the first control signal unit of the signal transceiving device at least the transmission delay ahead of the signal amplification control unit controlling the low noise amplifier to send the second radio frequency signal according to the second control instruction.

Similar to the signal transceiving device sending the first transmission signal in advance, the signal amplification device sending the second transmission signal in advance by the transmission delay can avoid the problem that the signal transceiving device fails to receive the second radio frequency signal because the signal transceiving device already cannot timely receive the second radio frequency signal according to the second control instruction due to the transmission delay when the second transmission signal generated by the signal amplification device arrives at the signal transceiving device.

The signal transceiving device and the signal amplification device according to the present disclosure may be applied in scenarios with special limitations on device volume, heat dissipation, power consumption, and power supply, such as an airplane, and a high-speed rail train.

The signal transceiving device may be designed as a part of a signal processor for performing signal processing and providing services for users, and may be installed in an equipment installation area of the airplane or the high-speed rail train; and the signal amplification device and the antenna (such as a satellite antenna, a radar antenna, or a ground communication antenna) may be designed as an integrated device and installed near a body surface of the airplane or the high-speed rail train together.

Figure 4:
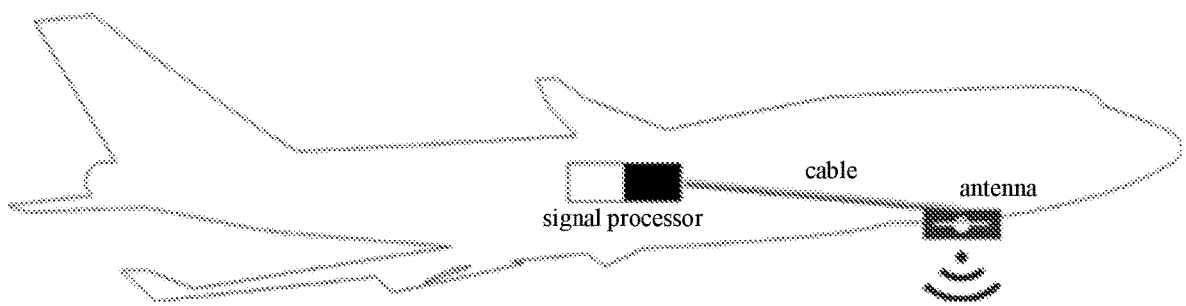
FIG. 4 is a schematic diagram of a signal transceiving device and a signal amplification device, which are installed on an airplane, according to the present disclosure.

FIG. 4 is a schematic diagram of a signal transceiving device and a signal amplification device, which are installed on an airplane, according to the present disclosure.

With reference to FIG. 4, a detailed description is given below by taking a case where the signal transceiving device and the signal amplification device constitute onboard devices (such as a satellite receiver, an onboard ground communication receiver, and a radar receiver) of the airplane as an example.

The signal transceiving device is provided as a signal processor, and may be installed in an electronic compartment, a cargo compartment, or a luggage compartment of the airplane because of its low heat generation and small volume. The signal amplification device and the antenna are designed as an integral structure and are installed on a body surface of the airplane with less limitations on device volume and power consumption.

The signal processor is connected to the antenna through a cable (such as a radio frequency cable), that is, the signal transceiving device and the signal amplification device are connected to each other through the cable. A filter is further disposed between the signal processor and the antenna to isolate mutual interference therebetween. Meanwhile, both the signal processor and the antenna have a direct current isolation function, the radio frequency signal transceiving unit is designed as a radio frequency chip, and is configured to send the first radio frequency signal to the power amplifier, that is, coupling the first radio frequency signal to the radio frequency cable to be transmitted through the radio frequency cable, and to receive the second radio frequency signal sent by the low noise amplifier.

When the signal transceiving device needs to send the first radio frequency signal and the signal amplification device needs to receive the first radio frequency signal, after the signal transmission-reception control unit determines the first time when the radio frequency signal transceiving unit sends the first radio frequency signal to the power amplifier, the signal transmission-reception control unit takes the first time difference between the first time and the basic pulse as the first control instruction, and sends the first control instruction to the second control signal unit of the signal amplification device through the first control signal unit. The first control signal unit controls the radio frequency signal transceiving unit according to the first control instruction to send the first radio frequency signal to the power amplifier of the signal amplification device at a time point having the first time difference relative to the basic pulse; and after receiving the first transmission signal from the first control signal unit, the second control signal unit converts the first transmission signal into the first control instruction, and controls the power amplifier to be in an operating state at the time point having the first time difference relative to the basic pulse according to the first time difference in the first control instruction, so as to receive the first radio frequency signal sent by the radio frequency signal transceiving unit.

When the signal transceiving device needs to receive the second radio frequency signal and the signal amplification device needs to send the second radio frequency signal, after the signal amplification control unit determines the second time when the low noise amplifier sends the second radio frequency signal to the radio frequency signal transceiving unit, the signal amplification control unit takes the second time difference between the second time and the basic pulse as the second control instruction, and sends the second control instruction to the first control signal unit through the second control signal unit. The second control signal unit controls the low noise amplifier to be in an operating state at a time point having the second time difference relative to the basic pulse according to the second control instruction, so as to send the second radio frequency signal to the radio frequency signal transceiving unit. After receiving the second transmission signal from the second control signal unit, the first control signal unit converts the second transmission signal into the second control instruction, and controls the radio frequency signal transceiving unit to receive the second radio frequency signal sent by the low noise amplifier at the time point having the second time difference relative to the basic pulse according to the second time difference in the second control instruction.

In the case where the radio frequency signal transceiving unit is connected to the power amplifier through one cable and connected to the low noise amplifier through the other cable (that is, in the FDD mode or the full-duplex mode), when the signal transceiving device needs to send the first radio frequency signal and the signal amplification device needs to receive the first radio frequency signal, the cable through which the power amplifier is connected to the radio frequency signal transceiving unit operates; and when the signal transceiving device needs to receive the second radio frequency signal and the signal amplification device needs to send the second radio frequency signal, the cable through which the low noise amplifier is connected to the radio frequency signal transceiving unit operates.

In the case where the radio frequency signal transceiving unit is connected to the power amplifier and the low noise amplifier through one cable (that is, in the TDD mode), a control switch is provided between the power amplifier and the low noise amplifier, and the radio frequency interface. When the signal transceiving device needs to send the first radio frequency signal and the signal amplification device needs to receive the first radio frequency signal, the signal amplification control unit controls the low noise amplifier to be powered off while controlling the control switch to be in an off state, controls the control switch to be in an on state after the low noise amplifier is powered off, and controls the power amplifier to be powered on when the control switch is in the on state. When the signal transceiving device needs to receive the second radio frequency signal and the signal amplification device needs to send the second radio frequency signal, the signal amplification control unit controls the power amplifier to be powered off while controlling the control switch to be in the off state, controls the control switch to be in the on state after the power amplifier is powered off, and controls the low noise amplifier to be powered on when the control switch is in the on state.

The first transmission signal and the second transmission signal need to be sent in advance by the transmission delay (the transmission delay between the first control signal unit and the second control signal unit).

In a case where the first control signal unit and the radio frequency signal transceiving unit are connected to the signal amplification device through the same cable, the first control signal unit and the second signal control unit may be designed as OOK modulation chips configured to modulate the first control instruction or the second control instruction into an OOK signal, or demodulate the OOK signal to obtain the first control instruction or the second control instruction.

In a case where the first control signal unit and the radio frequency signal transceiving unit are connected to the signal amplification device through different cables, the first control signal unit and the second signal control unit may be designed as radio frequency chips having operating frequencies different from an operating frequency of a radio frequency chip of the radio frequency signal transceiving unit, and configured to modulate the first control instruction or the second control instruction into a radio frequency signal having a frequency different from that of the first radio frequency signal sent by the radio frequency signal transceiving unit or that of the second radio frequency signal received by the radio frequency signal transceiving unit, or demodulate the radio frequency signal having the frequency different from that of the first radio frequency signal sent by or the second radio frequency signal received by the radio frequency signal transceiving unit to obtain the first control instruction or the second control instruction.

The first control instruction or the second control instruction may also be transmitted by applying the first direct current bias voltage or the second direct current bias voltage to the cable through which the first transmission signal or the second transmission signal is transmitted.

When the signal transceiving device needs to send the first radio frequency signal and the signal amplification device needs to receive the first radio frequency signal, the first control signal unit modulates the first control instruction into the first transmission signal easy to transmit, and applies, while sending the first transmission signal to the second control signal unit, the first direct current bias voltage with the first preset value to the cable through which the first transmission signal is transmitted, so as to indicate that the signal transceiving device is in the transmitting state. After receiving the first direct current bias voltage with the first preset value as the first transmission signal, the second control signal unit converts the first direct current bias voltage into the first control instruction, and sends the first control instruction to the signal amplification control unit.

When the signal amplification device needs to send the second radio frequency signal and the signal transceiving device needs to receive the second radio frequency signal, the second control signal unit modulates the second control instruction into the second transmission signal easy to transmit, and applies, while sending the second transmission signal to the first control signal unit, the second direct current bias voltage with the second preset value to the cable through which the second transmission signal is transmitted, so as to indicate that the signal transceiving device is in the receiving state. After receiving the second direct current bias voltage with the second preset value as the second transmission signal, the first control signal unit converts the second direct current bias voltage into the second control instruction, and sends the second control instruction to the signal transmission-reception control unit.

The first direct current bias voltage or the second direct current bias voltage applied to the cable connected between the signal transceiving device and the signal amplification device may also be configured to power the signal amplification device or the antenna.

The signal processor may further transmit various data to the antenna through the transmission path of the first transmission signal and the second transmission signal for performing processing, such as version upgrading, alarm query, heartbeat detection, asset query or fault detection, on the antenna, so that it may be ensured that the signal processor and the antenna implement an overall function as one device.

Figure 5:
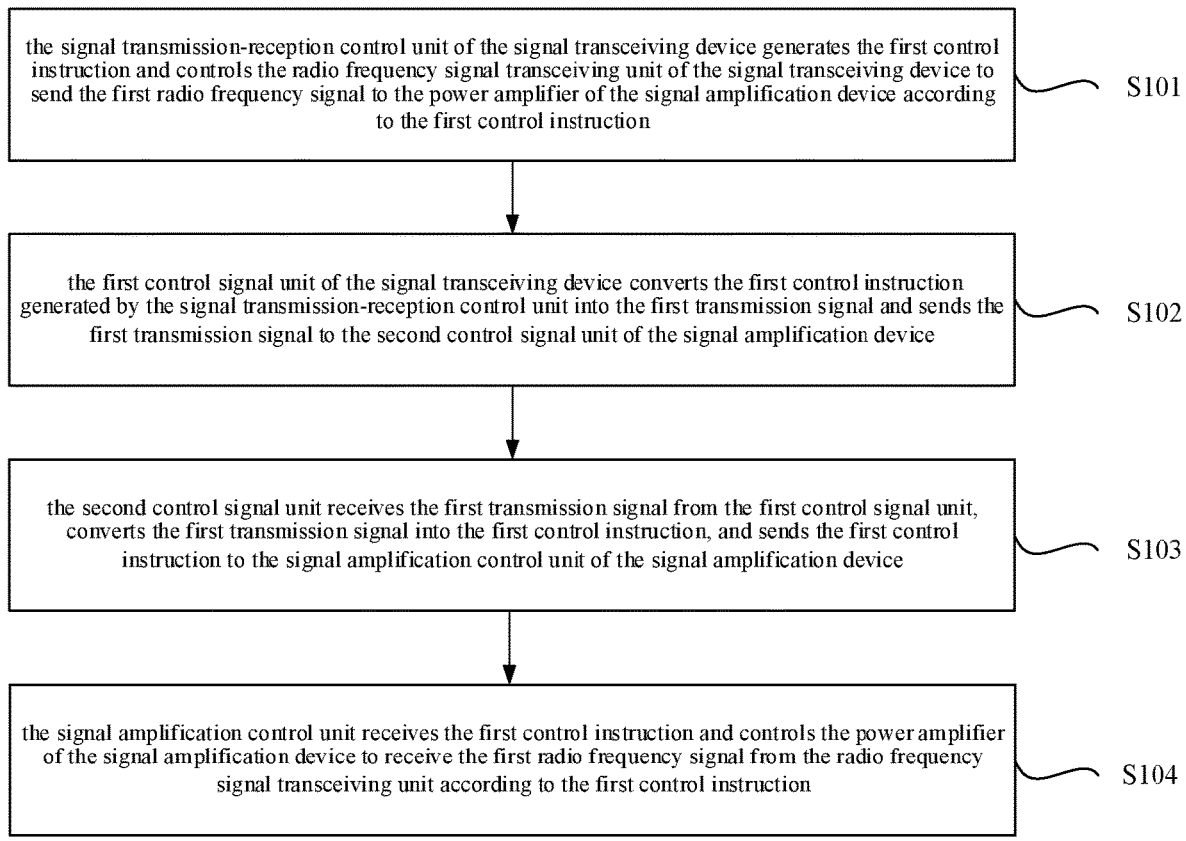
FIG. 5 is a flowchart illustrating part of an operation method of a communication system according to the present disclosure.
Figure 6:
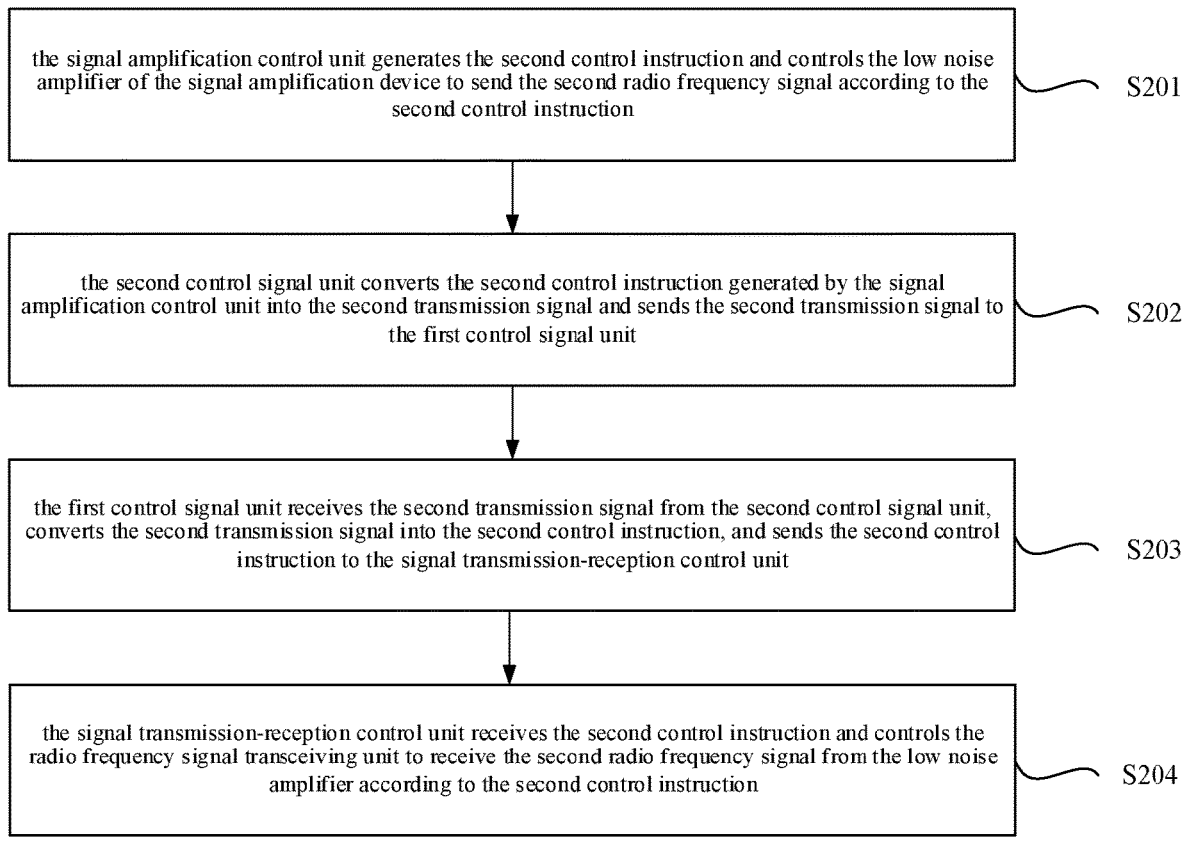
FIG. 6 is another flowchart illustrating part of the operation method of a communication system according to the present disclosure.

FIG. 5 is a flowchart illustrating an operation method of a communication system according to the present disclosure. FIG. 6 is another flowchart illustrating an operation method of a communication system according to the present disclosure.

The communication system according to the present disclosure includes the signal transceiving device and the signal amplification device as described above. The radio frequency interface of the signal transceiving device is connected to the radio frequency interface of the signal amplification device through a cable, and the transmission interface of the signal transceiving device is connected to the transmission interface of the signal amplification device through a cable. The operation method of the communication system includes at least one of a transmission process and a reception process with respect to the signal transceiving device. As shown in FIG. 5, the transmission process includes operations S101 to S104.

In operation S101, the signal transmission-reception control unit of the signal transceiving device generates the first control instruction and controls the radio frequency signal transceiving unit of the signal transceiving device to send the first radio frequency signal to the power amplifier of the signal amplification device according to the first control instruction.

In operation S102, the first control signal unit of the signal transceiving device converts the first control instruction generated by the signal transmission-reception control unit into the first transmission signal and sends the first transmission signal to the second control signal unit of the signal amplification device.

In operation S103, the second control signal unit receives the first transmission signal from the first control signal unit, converts the first transmission signal into the first control instruction, and sends the first control instruction to the signal amplification control unit of the signal amplification device.

In operation S104, the signal amplification control unit receives the first control instruction and controls the power amplifier of the signal amplification device to receive the first radio frequency signal from the radio frequency signal transceiving unit according to the first control instruction.

As shown in FIG. 6, the reception process includes operations S201 to S204.

In operation S201, the signal amplification control unit generates the second control instruction and controls the low noise amplifier of the signal amplification device to send the second radio frequency signal according to the second control instruction.

In operation S202, the second control signal unit converts the second control instruction generated by the signal amplification control unit into the second transmission signal and sends the second transmission signal to the first control signal unit.

In operation S203, the first control signal unit receives the second transmission signal from the second control signal unit, converts the second transmission signal into the second control instruction, and sends the second control instruction to the signal transmission-reception control unit.

In operation S204, the signal transmission-reception control unit receives the second control instruction and controls the radio frequency signal transceiving unit to receive the second radio frequency signal from the low noise amplifier according to the second control instruction.

In the operation method of the communication system according to the present disclosure, the signal amplification device is connected to the signal transceiving device through cables, and the devices for signal amplification (such as the power amplifier and the low noise amplifier) are removed from the signal transceiving device. On the one hand, with the high-power devices such as the power amplifier removed, heat consumption of the signal transceiving device is greatly reduced, and an ambient temperature of the space where the signal transceiving device is located is reduced, so that the signal transceiving device can adapt to the application scenario with a relatively high ambient temperature. On the other hand, with the devices for signal amplification (such as the power amplifier and the low noise amplifier) removed from the signal transceiving device, a volume of the signal transceiving device is accordingly reduced, a volume of a heat capacity structure needed by the signal transceiving device is reduced due to the reduction of the heat consumption of the signal transceiving device, and the volume of the signal transceiving device is correspondingly reduced. Thus, the signal transceiving device can adapt to the application scenario with the strict volume requirement (such as the application scenario with the limited volume).

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. A signal transceiving device, comprising:
   a radio frequency signal transceiving unit, a signal transmission-reception control unit, and a first control signal unit,
   wherein the radio frequency signal transceiving unit is connected between a baseband interface and at least one radio frequency interface, and is configured to generate a first radio frequency signal according to a baseband signal from the baseband interface, send the first radio frequency signal to the at least one radio frequency interface, and receive a second radio frequency signal from the at least one radio frequency interface; and the at least one radio frequency interface is configured to be connected to a radio frequency interface of a signal amplification device through a cable and send the first radio frequency signal to the signal amplification device,
   the signal transmission-reception control unit is connected to the radio frequency signal transceiving unit, and is configured to generate a first control instruction, control the radio frequency signal transceiving unit to send the first radio frequency signal to the at least one radio frequency interface according to the first control instruction, receive a second control instruction, and control the radio frequency signal transceiving unit to receive the second radio frequency signal from the at least one radio frequency interface according to the second control instruction, and
   the first control signal unit is connected between the signal transmission-reception control unit and a transmission interface of the signal transceiving device, and is configured to convert the first control instruction generated by the signal transmission-reception control unit into a first transmission signal, send the first transmission signal to the transmission interface of the signal transceiving device, receive a second transmission signal from the transmission interface of the signal transceiving device, convert the second transmission signal into the second control instruction, and send the second control instruction to the signal transmission-reception control unit; and the transmission interface of the signal transceiving device is configured to be connected to a transmission interface of the signal amplification device through a cable and send the first transmission signal to the signal amplification device to enable the signal amplification device to receive the first radio frequency signal based on the first transmission signal.

2. The signal transceiving device of claim 1, wherein the signal transmission-reception control unit generating the first control instruction comprises:
   determining first time when controlling the radio frequency signal transceiving unit to send the first radio frequency signal to the at least one radio frequency interface, and generating the first control instruction according to a first time difference between the first time and a basic pulse.

3. The signal transceiving device of claim 1, wherein the first control signal unit converting the first control instruction generated by the signal transmission-reception control unit into the first transmission signal and sending the first transmission signal to the transmission interface of the signal transceiving device comprises:
   determining a first applied voltage value according to the first control instruction generated by the signal transmission-reception control unit; and
   applying a first direct current bias voltage with the first applied voltage value to a cable connected to the transmission interface of the signal transceiving device, so as to send the first direct current bias voltage to the transmission interface of the signal transceiving device as the first transmission signal.

4. The signal transceiving device of claim 1, wherein the first control signal unit converting the first control instruction generated by the signal transmission-reception control unit into the first transmission signal and sending the first transmission signal to the transmission interface of the signal transceiving device comprises:

converting the first control instruction generated by the signal transmission-reception control unit into the first transmission signal, and sending the first transmission signal by the first control signal unit to the transmission interface of the signal transceiving device at least a predetermined transmission delay ahead of the signal transmission-reception control unit controlling the radio frequency signal transceiving unit to send the first radio frequency signal according to the first control instruction.

5. The signal transceiving device of claim 1, wherein the at least one radio frequency interface and the transmission interface of the signal transceiving device are an integral structure.

6. The signal transceiving device of claim 1, wherein the at least one radio frequency interface comprises a first radio frequency interface and a second radio frequency interface, the radio frequency signal transceiving unit is configured to send the first radio frequency signal to the first radio frequency interface and receive the second radio frequency signal from the second radio frequency interface.

7. A signal amplification device, comprising:
  a power amplifier, a low noise amplifier, a signal amplification control unit, and a second control signal unit,
  wherein the power amplifier is connected between an antenna and a radio frequency interface of the signal amplification device, and is configured to receive a first radio frequency signal from the radio frequency interface of the signal amplification device, amplify the first radio frequency signal, and then send the amplified first radio frequency signal to the antenna, and the radio frequency interface of the signal amplification device is configured to be connected to a radio frequency interface of a signal transceiving device through a cable,
  the low noise amplifier is connected between the antenna and a radio frequency interface of the signal amplification device, and is configured to receive a second radio frequency signal from the antenna, amplify the second radio frequency signal, and then send the amplified second radio frequency signal to the radio frequency interface of the signal amplification device,
  the signal amplification control unit is connected to the power amplifier and the low noise amplifier, and is configured to receive a first control instruction and control the power amplifier to receive the first radio frequency signal from the radio frequency interface of the signal amplification device according to the first control instruction, or generate a second control instruction and control the low noise amplifier to send the second radio frequency signal to the radio frequency interface of the signal amplification device according to the second control instruction, and
  the second control signal unit is connected between the signal amplification control unit and a transmission interface of the signal amplification device, and is configured to convert the second control instruction generated by the signal amplification control unit into a second transmission signal and send the second transmission signal to the transmission interface of the signal amplification device, or receive a first transmission signal from the transmission interface of the signal amplification device, convert the first transmission signal into the first control instruction, and send the first control instruction to the signal amplification control unit, and the transmission interface of the signal amplification device is configured to be connected to a transmission interface of the signal transceiving device through a cable and send the second transmission signal to the signal transceiving device to enable the signal transceiving device to receive the second radio frequency signal based on the second transmission signal.

8. The signal amplification device of claim 7, wherein the radio frequency interface connected to the power amplifier and the radio frequency interface connected to the low noise amplifier are a same radio frequency interface.

9. The signal amplification device of claim 8, wherein a switching unit is provided between the power amplifier and the low noise amplifier, and the radio frequency interface;
  in a case where the signal amplification control unit receives the first control instruction, the signal amplification control unit controlling the power amplifier to receive the first radio frequency signal from the radio frequency interface of the signal amplification device according to the first control instruction comprises: controlling the switching unit to connect the radio frequency interface of the signal amplification device to the power amplifier; and
  in a case where the low noise amplifier receives the second radio frequency signal from the antenna, the signal amplification control unit controlling the low noise amplifier to send the second radio frequency signal to the radio frequency interface of the signal amplification device according to the second control instruction comprises: controlling the switching unit to connect the radio frequency interface of the signal amplification device to the low noise amplifier.

10. The signal amplification device of claim 7, wherein the signal amplification control unit generating the second control instruction comprises:
  determining second time when controlling the low noise amplifier to send the second radio frequency signal to the radio frequency interface of the signal amplification device, and generating the second control instruction according to a second time difference between the second time and a basic pulse.

11. The signal amplification device of claim 7, wherein the second control signal unit converting the second control instruction generated by the signal amplification control unit into the second transmission signal and sending the second transmission signal to the transmission interface of the signal amplification device comprises:
  determining a second applied voltage value according to the second control instruction generated by the signal amplification control unit; and
  applying a second direct current bias voltage with the second applied voltage value to a cable connected to the transmission interface of the signal amplification device, so as to send the second direct current bias voltage to the transmission interface of the signal amplification device as the second transmission signal.

12. The signal amplification device of claim 7, wherein the second control signal unit converting the second control instruction generated by the signal amplification control unit into the second transmission signal and sending the second transmission signal to the transmission interface of the signal amplification device comprises:
  converting the second control instruction generated by the signal amplification control unit into the second transmission signal, and sending the second transmission signal by the second control signal unit to the transmission interface of the signal amplification device at least a predetermined transmission delay ahead of the signal amplification control unit controlling the low noise amplifier to send the second radio frequency signal according to the second control instruction.

13. An operation method of a communication system comprising a signal transceiving device and a signal amplification device, the signal transceiving device, comprising: a radio frequency signal transceiving unit, a signal transmission-reception control unit, and a first control signal unit, and the signal amplification device, comprising: a power amplifier, a low noise amplifier, a signal amplification control unit, and a second control signal unit wherein the radio frequency signal transceiving unit is connected between a baseband interface and at least one radio frequency interface, and is configured to generate a first radio frequency signal according to a baseband signal from the baseband interface, send the first radio frequency signal to the at least one radio frequency interface, and receive a second radio frequency signal from the at least one radio frequency interface; and the at least one radio frequency interface is configured to be connected to a radio frequency interface of the signal amplification device through a cable and send the first radio frequency signal to the signal amplification device, the signal transmission-reception control unit is connected to the radio frequency signal transceiving unit, and is configured to generate a first control instruction, control the radio frequency signal transceiving unit to send the first radio frequency signal to the at least one radio frequency interface according to the first control instruction, receive a second control instruction, and control the radio frequency signal transceiving unit to receive the second radio frequency signal from the at least one radio frequency interface according to the second control instruction, and the first control signal unit is connected between the signal transmission-reception control unit and a transmission interface of the signal transceiving device, and is configured to convert the first control instruction generated by the signal transmission-reception control unit into a first transmission signal, send the first transmission signal to the transmission interface of the signal transceiving device, receive a second transmission signal from the transmission interface of the signal transceiving device, convert the second transmission signal into the second control instruction, and send the second control instruction to the signal transmission-reception control unit; and the transmission interface of the signal transceiving device is configured to be connected to a transmission interface of the signal amplification device through a cable and send the first transmission signal to the signal amplification device to enable the signal amplification device to receive the first radio frequency signal based on the first transmission signal, wherein the power amplifier is connected between an antenna and a radio frequency interface of the signal amplification device, and is configured to receive the first radio frequency signal from the radio frequency interface of the signal amplification device, amplify the first radio frequency signal, and then send the amplified first radio frequency signal to the antenna, and the radio frequency interface of the signal amplification device is configured to be connected to a radio frequency interface of the signal transceiving device through a cable, the low noise amplifier is connected between the antenna and a radio frequency interface of the signal amplification device, and is configured to receive the second radio frequency signal from the antenna, amplify the second radio frequency signal, and then send the amplified second radio frequency signal to the radio frequency interface of the signal amplification device, the signal amplification control unit is connected to the power amplifier and the low noise amplifier, and is configured to receive the first control instruction and control the power amplifier to receive the first radio frequency signal from the radio frequency interface of the signal amplification device according to the first control instruction, or generate the second control instruction and control the low noise amplifier to send the second radio frequency signal to the radio frequency interface of the signal amplification device according to the second control instruction, and the second control signal unit is connected between the signal amplification control unit and the transmission interface of the signal amplification device, and is configured to convert the second control instruction generated by the signal amplification control unit into the second transmission signal and send the second transmission signal to the transmission interface of the signal amplification device, or receive the first transmission signal from the transmission interface of the signal amplification device, convert the first transmission signal into the first control instruction, and send the first control instruction to the signal amplification control unit, and the transmission interface of the signal amplification device is configured to be connected to the transmission interface of the signal transceiving device through the cable and send the second transmission signal to the signal transceiving device to enable the signal transceiving device to receive the second radio frequency signal based on the second transmission signal, the operation method comprises at least one of a transmission process and a reception process with respect to the signal transceiving device, and the transmission process comprises:

the signal transmission-reception control unit generates the first control instruction and controls the radio frequency signal transceiving unit to send the first radio frequency signal to the power amplifier according to the first control instruction;

the first control signal unit converts the first control instruction generated by the signal transmission-reception control unit into the first transmission signal and sends the first transmission signal to the second control signal unit;

the second control signal unit receives the first transmission signal from the first control signal unit, converts the first transmission signal into the first control instruction, and sends the first control instruction to the signal amplification control unit; and the signal amplification control unit receives the first control instruction and controls the power amplifier to receive the first radio frequency signal from the radio frequency signal transceiving unit according to the first control instruction.

14. The operation method of claim 13, wherein the reception process comprises:

the signal amplification control unit generates the second control instruction and controls the low noise amplifier to send the second radio frequency signal according to the second control instruction;

the second control signal unit converts the second control instruction generated by the signal amplification control unit into the second transmission signal and sends the second transmission signal to the first control signal unit;

the first control signal unit receives the second transmission signal from the second control signal unit, converts the second transmission signal into the second control instruction, and sends the second control instruction to the signal transmission-reception control unit; and the signal transmission-reception control unit receives the second control instruction and controls the radio frequency signal transceiving unit to receive the second radio frequency signal from the low noise amplifier according to the second control instruction.

* * * * *